(12) United States Patent
Abedini et al.

(10) Patent No.: US 10,477,593 B2
(45) Date of Patent: Nov. 12, 2019

(54) TECHNIQUES AND APPARATUSES FOR ACCESS IN A BACKHAUL NETWORK

(71) Applicant: QUALCOMM Incorporated, San Diego, CA (US)

(72) Inventors: Navid Abedini, Raritan, NJ (US); Muhammad Nazmul Islam, Edison, NJ (US); Sundar Subramanian, San Diego, CA (US); Karl Georg Hampel, Hoboken, NJ (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/000,639

(22) Filed: Jun. 5, 2018

(65) Prior Publication Data

US 2018/0359788 A1 Dec. 13, 2018

Related U.S. Application Data

(60) Provisional application No. 62/517,027, filed on Jun. 8, 2017, provisional application No. 62/538,247, filed on Jul. 28, 2017.

(51) Int. Cl.
*H04W 74/08* (2009.01)
*H04W 92/02* (2009.01)
(Continued)

(52) U.S. Cl.
CPC ...... *H04W 74/0875* (2013.01); *H04B 7/0626* (2013.01); *H04W 24/02* (2013.01);
(Continued)

(58) Field of Classification Search
None
See application file for complete search history.

(56) References Cited

U.S. PATENT DOCUMENTS

| 5,613,211 A | 3/1997 | Matsuno |
| 5,699,388 A | 12/1997 | Wang et al. |

(Continued)

FOREIGN PATENT DOCUMENTS

| CN | 101047433 B | 10/2010 |
| WO | 2009132709 A1 | 11/2009 |

(Continued)

OTHER PUBLICATIONS

International Search Report and Written Opinion—PCT/US2018/036324—ISA/EPO—dated Sep. 10, 2018.

*Primary Examiner* — Kevin D Mew
(74) *Attorney, Agent, or Firm* — Harrity & Harrity, LLP

(57) ABSTRACT

Certain aspects of the present disclosure generally relate to wireless communication. In some aspects, a base station may detect one or more base stations based at least in part on synchronization communications associated with the one or more base stations, and may determine one or more priority levels associated with the one or more base stations, wherein a given priority level, of the one or more priority levels, identifies a priority associated with initiating access to a wireless backhaul network via a respective base station of the one or more base stations. The base station may initiate, based at least in part on the one or more priority levels, an access procedure with a set of base stations of the one or more base stations. Numerous other aspects are provided.

30 Claims, 11 Drawing Sheets

(51) Int. Cl.
*H04W 92/20* (2009.01)
*H04B 7/06* (2006.01)
*H04W 56/00* (2009.01)
*H04W 24/02* (2009.01)

(52) U.S. Cl.
CPC ......... *H04W 56/001* (2013.01); *H04W 92/02* (2013.01); *H04W 92/20* (2013.01); *H04W 74/0833* (2013.01); *H04W 74/0891* (2013.01)

(56) References Cited

U.S. PATENT DOCUMENTS

| | | | |
|---|---|---|---|
| 8,605,646 B2 | 12/2013 | Wang et al. | |
| 9,119,112 B1* | 8/2015 | Hou | H04W 48/20 370/338 |
| 9,301,271 B2 | 3/2016 | Cui et al. | |
| 2007/0248060 A1* | 10/2007 | Mooney | H04L 47/15 370/338 |
| 2012/0082088 A1* | 4/2012 | Dalsgaard | H04L 12/4625 370/315 |
| 2012/0129517 A1* | 5/2012 | Fox | H04L 41/5025 455/425 |
| 2013/0077472 A1* | 3/2013 | Tan | H04L 69/40 370/221 |
| 2013/0107705 A1* | 5/2013 | Dinan | H04W 72/0446 370/230 |
| 2013/0143574 A1* | 6/2013 | Teyeb | H04W 36/0011 455/438 |
| 2013/0155847 A1* | 6/2013 | Li | H04W 24/04 370/225 |
| 2013/0188500 A1* | 7/2013 | He | H04W 28/16 370/252 |
| 2013/0208647 A1 | 8/2013 | Kottkamp et al. | |
| 2013/0252650 A1* | 9/2013 | Halbauer | H04W 74/00 455/501 |
| 2014/0204909 A1* | 7/2014 | Cheng | H04W 8/082 370/331 |
| 2014/0307569 A1* | 10/2014 | Barbieri | H04L 5/0032 370/252 |
| 2014/0321434 A1* | 10/2014 | Gayde | H04W 36/04 370/336 |
| 2015/0045032 A1* | 2/2015 | Tomici | H04W 36/04 455/436 |
| 2015/0181455 A1* | 6/2015 | Song | H04W 28/0205 455/452.1 |
| 2015/0334704 A1* | 11/2015 | Wei | H04W 72/0446 370/294 |
| 2015/0334765 A1* | 11/2015 | Rahman | H04W 24/02 370/328 |
| 2015/0358990 A1* | 12/2015 | Kovacs | H04W 24/02 370/329 |
| 2016/0037511 A1* | 2/2016 | Vincze | H04B 7/024 370/329 |
| 2016/0095034 A1* | 3/2016 | Hampel | H04W 36/14 370/331 |
| 2016/0302235 A1* | 10/2016 | Hwang | H04W 74/08 |
| 2017/0238301 A1* | 8/2017 | Nakazawa | H04J 11/00 370/329 |
| 2018/0092137 A1* | 3/2018 | Mehta | H04W 76/10 |
| 2018/0288734 A1* | 10/2018 | Islam | H04W 68/005 |

FOREIGN PATENT DOCUMENTS

| | | |
|---|---|---|
| WO | 2010142852 A1 | 12/2010 |
| WO | 2015113286 A1 | 8/2015 |

* cited by examiner

TECHNIQUES AND APPARATUSES FOR ACCESS IN A BACKHAUL NETWORK

CROSS REFERENCE TO RELATED APPLICATIONS UNDER 35 U.S.C. § 119

This application claims priority to U.S. Provisional Patent Application No. 62/517,027 filed on Jun. 8, 2017 entitled "TECHNIQUES AND APPARATUSES FOR INITIAL ACCESS IN A BACKHAUL NETWORK," and U.S. Provisional Patent Application No. 62/538,247 filed on Jul. 28, 2017 entitled "TECHNIQUES AND APPARATUSES FOR ACCESS IN A BACKHAUL NETWORK," which are incorporated by reference herein.

INTRODUCTION

Aspects of the present disclosure generally relate to wireless communication, and more particularly to techniques and apparatuses for access in a backhaul network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), and New Radio (NR).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include detecting, by a base station, one or more base stations based at least in part on synchronization communications associated with the one or more base stations; determining, by the base station, one or more priority levels associated with the one or more base stations, wherein a given priority level, of the one or more priority levels, identifies a priority associated with initiating access to a wireless backhaul network via a respective base station of the one or more base stations; and initiating, by the base station and based at least in part on the one or more priority levels, an access procedure with a set of base stations of the one or more base stations.

In some aspects, a base station for wireless communication may include a memory and one or more processors configured to detect one or more base stations based at least in part on synchronization communications associated with the one or more base stations; determine one or more priority levels associated with the one or more base stations, wherein a given priority level, of the one or more priority levels, identifies a priority associated with initiating access to a wireless backhaul network via a respective base station of the one or more base stations; and initiate, based at least in part on the one or more priority levels, an access procedure with a set of base stations of the one or more base stations.

In some aspects, a non-transitory computer-readable medium may store one or more instructions for wireless communication. The one or more instructions, when executed by one or more processors of a base station, may cause the one or more processors to detect one or more base stations based at least in part on synchronization communications associated with the one or more base stations; determine one or more priority levels associated with the one or more base stations, wherein a given priority level, of the one or more priority levels, identifies a priority associated with initiating access to a wireless backhaul network via a respective base station of the one or more base stations; and initiate, based at least in part on the one or more priority levels, an access procedure with a set of base stations of the one or more base stations.

In some aspects, an apparatus for wireless communication may include means for detecting one or more base stations based at least in part on synchronization communications associated with the one or more base stations; means for determining one or more priority levels associated with the one or more base stations, wherein a given priority level, of the one or more priority levels, identifies a priority associated with initiating access to a wireless backhaul network via a respective base station of the one or more base stations; and means for initiating, based at least in part on the one or more priority levels, an access procedure with a set of base stations of the one or more base stations.

In some aspects, a method for wireless communication may include transmitting, by a base station, synchronization communications associated with the base station, where the synchronization communications include a base station synchronization communication for initiation of an access procedure by another base station; and transmitting, by the base station and based at least in part on transmitting the synchronization communications, information associated with one or more parameters of the base station.

In some aspects, a base station for wireless communication may include a memory and one or more processors configured to transmit synchronization communications associated with the base station, where the synchronization communications include a base station synchronization communication for initiation of an access procedure by another base station; and transmit, based at least in part on transmitting the synchronization communications, information associated with one or more parameters of the base station.

In some aspects, a non-transitory computer-readable medium may store one or more instructions for wireless communication. The one or more instructions, when executed by one or more processors of a base station, may cause the one or more processors to transmit synchronization communications associated with the base station, where the synchronization communications include a base station synchronization communication for initiation of an access procedure by another base station; and transmit, based at least in part on transmitting the synchronization communications, information associated with one or more parameters of the base station.

In some aspects, an apparatus for wireless communication may include means for transmitting synchronization communications associated with a base station, where the synchronization communications include a base station synchronization communication for initiation of an access procedure by another base station; and means for transmitting, based at least in part on transmitting the synchronization communications, information associated with one or more parameters of the base station.

Aspects generally include a method, a base station, a wireless node, a user equipment, a non-transitory computer-readable medium, and a computer program product as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
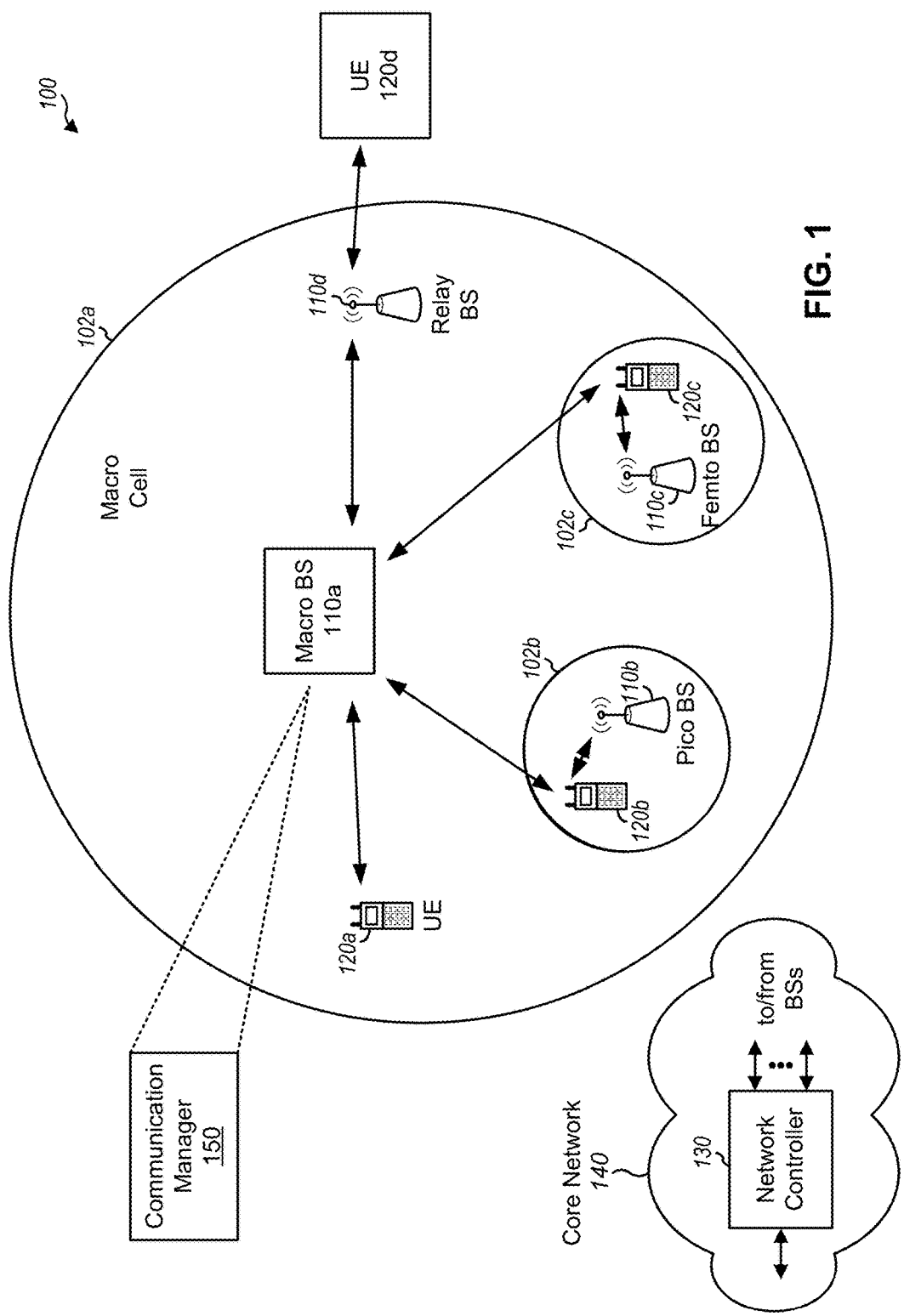
FIG. 1 is a block diagram conceptually illustrating an example of a wireless communication network, in accordance with various aspects of the present disclosure.

A wireless backhaul network may be deployed to provide connectivity to a core network. In a wireless backhaul network, an anchor base station may communicate with the core network via a wired connection (e.g., a fiber connection), and non-anchor base stations may communicate with the anchor base station via wireless links. In some cases, a chain of non-anchor base stations may communicate via wireless links along the chain to form a path to the anchor base station and the core network. Additionally, or alternatively, a single base station may communicate wirelessly with multiple other base stations, forming a mesh network.

A wireless backhaul network may permit simple and low-cost deployment of additional base stations because the base stations may be able to detect one another automatically and be deployed without expensive infrastructure, such as wired connections. Furthermore, network resources (e.g., frequency resources, time resources, and/or the like) may be shared between wireless access links (e.g., between a base station and a UE or between UEs) and wireless backhaul links (e.g., between base stations), thereby enhancing wireless link capacity and reducing network latency. In some cases, the base stations and/or UEs may utilize millimeter waves and/or directional communications (e.g., beamforming, precoding, and/or the like) for the wireless links to reduce inter-link interference.

To support automatic deployment of new base stations, a deployed base station may periodically transmit synchronization communications, such as synchronization blocks including one or more synchronization signals (e.g., a primary synchronization signal (PSS), a secondary synchronization signal (SSS), one or more reference signals (e.g., a beam measurement reference signal (BRS), a channel state information reference signal (CSI-RS)), and/or the like), and/or one or more synchronization channels (e.g., a physical broadcast channel (PBCH), via which a demodulation reference signal (DMRS) and/or other synchronization signals may be transmitted).

A new base station may detect a synchronization communication from a deployed base station, and may use the synchronization communication to determine time synchronization, frequency synchronization, and/or other system information for establishing a wireless connection with the deployed base station (e.g., using an access procedure, such as a random access procedure). In this way, the new base station may be able to automatically connect to a deployed base station, thereby simplifying deployment of new base stations in the wireless backhaul network (e.g., initial access to the wireless backhaul network, access to the wireless backhaul network after previously accessing the wireless backhaul network, and/or the like).

However, such automatic deployment may be complicated when a new base station detects multiple deployed base stations. In such a case, the new base station should be capable of selecting a set of the detected multiple base stations with which to initiate an access procedure for connecting to the wireless backhaul network (e.g., in order to facilitate an acceptable connection to the backhaul network, a best-available connection to the backhaul network, and/or the like). Further, it may be advantageous for the new base station to track another set of the detected multiple base stations in order to allow the base station to initiate the access procedure with one or more of the other detected multiple base stations at a later time (e.g., without a need to search for synchronization communications associated with the other set of detected multiple base stations a second time).

Aspects described herein provide a base station capable of selecting a first set of detected base stations, of one or more detected base stations, based at least in part on priority levels associated with the one or more detected base stations, and initiating an access procedure associated with the first set of detected base stations. Furthermore, the base station described herein is capable of selecting a second set of detected base stations, of the one or more detected base stations, based at least in part on the priority levels associated with the one or more detected base stations, and tracking the second set of detected base stations. Additional details are described elsewhere herein.

Aspects described herein further provide a base station capable of transmitting synchronization communications (e.g., including a base station synchronization communication for initiation of an access procedure by new base stations), and transmitting information associated with one or more parameters of the base station such that a new base station may determine a priority level associated with the base station. Additional details are described elsewhere herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Using the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be a 5G or NR network or some other wireless network, such as an LTE network. Wireless network 100 may include a number of base stations (BSs) 110 (shown as BS 110a, BS 110b, BS 110c, and BS 110d) and other network entities. A BS is an entity that communicates with user equipment (UEs) and/or other BSs, and may also be referred to as a Node B, an eNB, a gNB, a NR BS, a 5G NB, an access point, a transmit receive point (TRP), an access node (AN), and/or the like. Each BS may provide communication coverage for a particular geographic area. In 3GPP, the term "cell" can refer to a coverage area of a BS and/or a BS subsystem serving this coverage area, depending on the context in which the term is used. As used herein, the term "wireless node" may refer to a base station and/or a user equipment.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, a wireless link (e.g., a wireless backhaul link), and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may be implemented in a core network 140.

Core network 140 may include one or more devices to communicate with and/or control BSs 110 and/or one or more devices to route packets through core network 140 to one or more other networks. For example, core network 140 may include a mobility management entity (MME), a serving gateway (SGW), a packet data network (PDN) gateway (PGW), a home subscriber server (HSS), a policy charging and rules function (PCRF) device, an authentication, authorization, and accounting (AAA) server, and/or the like.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) UEs and/or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. MTC UEs, as well as other types of UEs, may be implemented as narrowband internet of things (NB-IoT) devices. UE 120 may be included inside a housing that houses components of UE 120, such as processor components, memory components, and/or the like. As used herein, the term "wireless node" may refer to a BS 110 and/or a UE 120.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

As shown in FIG. 1, base station 110 may include a communication manager 150. As described in more detail elsewhere herein, communication manager 150 may detect one or more base stations based at least in part on synchronization communications associated with the one or more base stations, may determine one or more priority levels associated with the one or more base stations, may initiate, based at least in part on the one or more priority levels, an access procedure with a first set of base stations of the one or more base stations, may track, based at least in part on the one or more priority levels, a second set of base stations of the one or more base stations, and/or may perform one or more other operations described herein. Communication manager 150 may include one or more components of FIG. 2, as described below. Further, as described in more detail elsewhere herein, communication manager 150 may transmit synchronization communications associated with the base station, where the synchronization communications may include a base station synchronization communication for initiation of an access procedure by another base station, may transmit, based at least in part on transmitting the synchronization communications, information associated with one or more parameters of the base station, and/or may perform one or more other operations described herein.

As indicated above, FIG. 1 is provided as an example. Other examples are possible and may differ from what was described with regard to FIG. 1.

Figure 2:
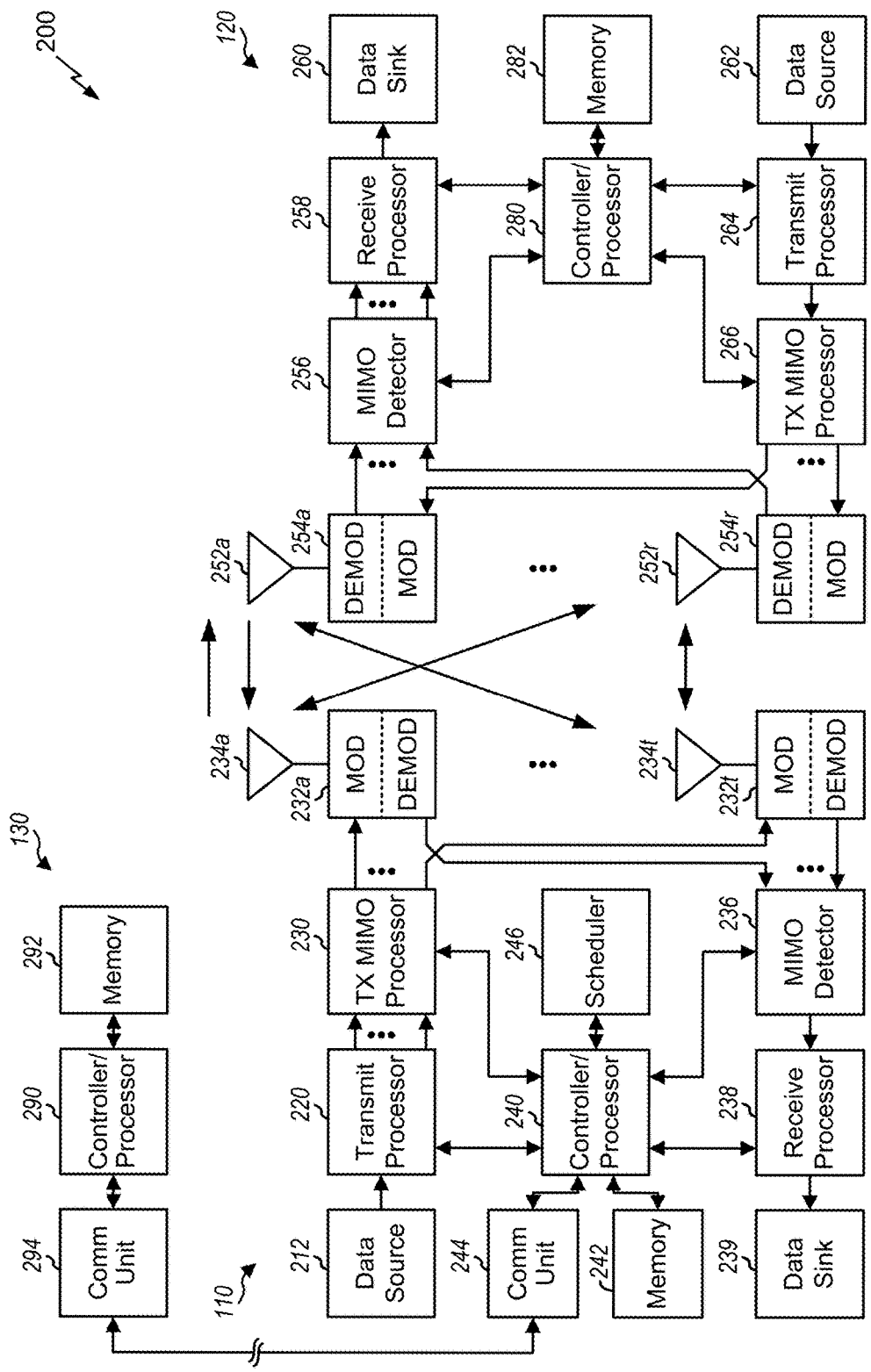
FIG. 2 shows a block diagram conceptually illustrating an example of a base station in communication with a user equipment (UE) in a wireless communication network, in accordance with various aspects of the present disclosure.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., DMRS, CRS, and/or the like) and synchronization signals (e.g., a PSS, an SSS, and/or the like).

A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292. Memories 242 and 282 may store data and program codes for base station 110 and UE 120, respectively. A scheduler 246 may schedule UEs for data transmission on the downlink and/or uplink.

Controllers/processors 240 and/or any other component(s) in FIG. 2 may direct the operation at base station 110, respectively, to perform operations associated with access in a wireless backhaul network, as described in more detail elsewhere herein. For example, controller/processor 240 and/or other processors and modules at base station 110, may perform or direct operations of base station 110 to perform one or more operations associated with access in a wireless backhaul network. For example, controller/processor 240 and/or other controllers/processors and modules at base station 110 may perform or direct operations of, for example, process 800 of FIG. 8, process 900 of FIG. 9, and/or other processes described herein. In some aspects, one or more of the components shown in FIG. 2 may be employed to perform example process 800, example process 900, and/or other processes for the techniques described herein.

Additionally, or alternatively, base station 110 may include means for detecting one or more base stations based at least in part on synchronization communications associated with the one or more base stations, means for determining one or more priority levels associated with the one or more base stations, wherein a given priority level, of the one or more priority levels, identifies a priority associated with initiating access to a wireless backhaul network via a respective base station of the one or more base stations, means for initiating, based at least in part on the one or more priority levels, an access procedure with a first set of base stations of the one or more base stations, and/or means for performing other operations described herein.

Additionally, or alternatively, base station 110 may include means for transmitting synchronization communications associated with the base station, where the synchronization communications may include a base station synchronization communication for initiation of an access procedure by another base station, means for transmitting, based at least in part on transmitting the synchronization communications, information associated with one or more parameters of the base station, and/or means for performing other operations described herein.

Such means may include one or more components shown in FIG. 2. Additionally, or alternatively, communication manager 150 may include one or more components shown in FIG. 2.

As indicated above, FIG. 2 is provided as an example. Other examples are possible and may differ from what was described with regard to FIG. 2.

Figure 3A:
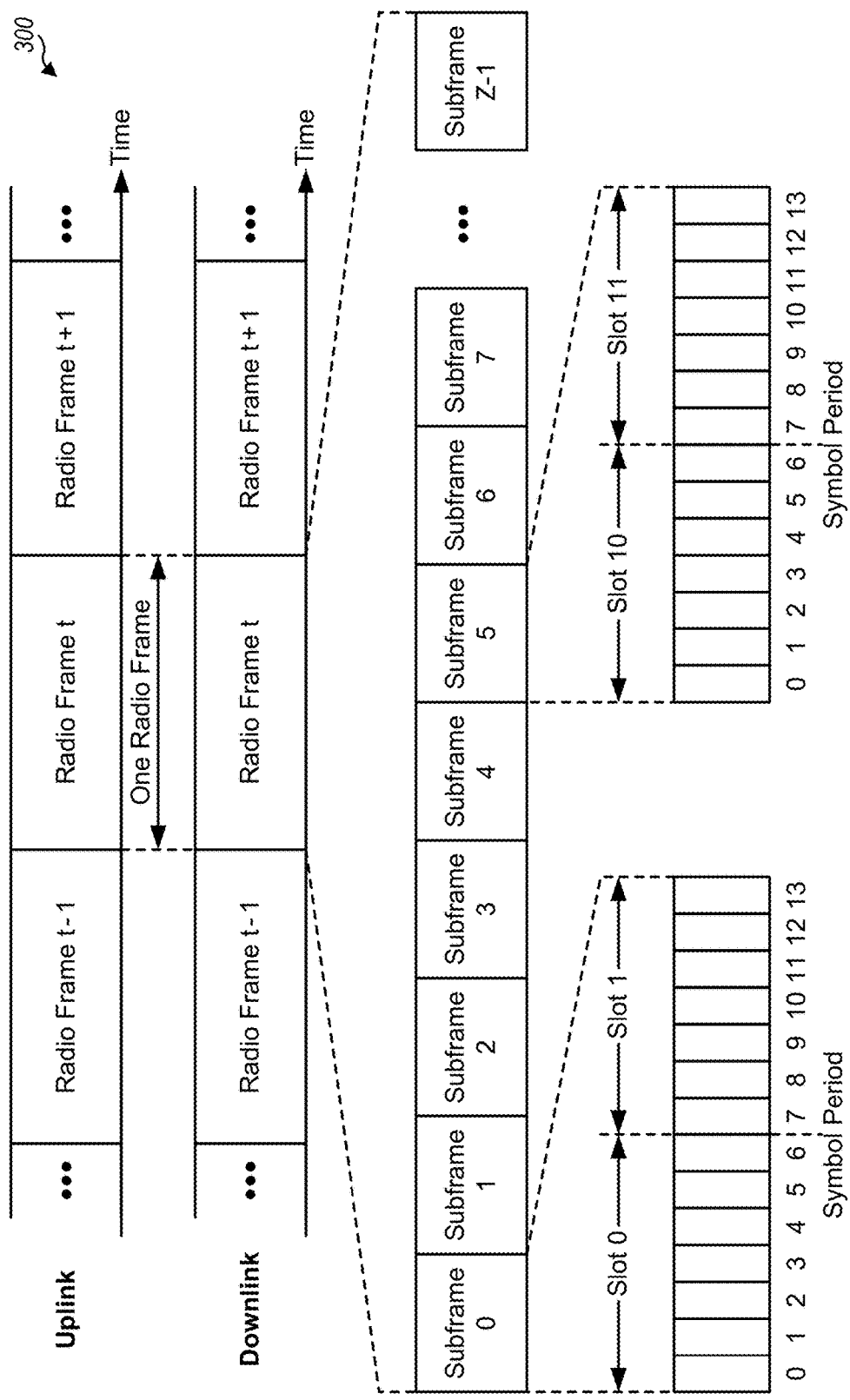
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a BS may transmit synchronization signals. For example, a BS may transmit a primary synchronization signal (PSS), a secondary synchronization signal (SSS), a tertiary synchronization signal (TSS), and/or the like, on the downlink for each cell supported by the BS. The PSS and SSS may be used by UEs for cell search and acquisition, and/or may be used by other BSs for automatic deployment in a wireless backhaul network. For example, the PSS may be used by UEs and/or BSs to determine symbol timing, and the SSS may be used by UEs and/or BSs to determine a physical cell identifier, associated with the BS, and frame timing. The BS may also transmit a physical broadcast channel (PBCH). The PBCH may carry some system information, such as system information that supports access by UEs and/or BSs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
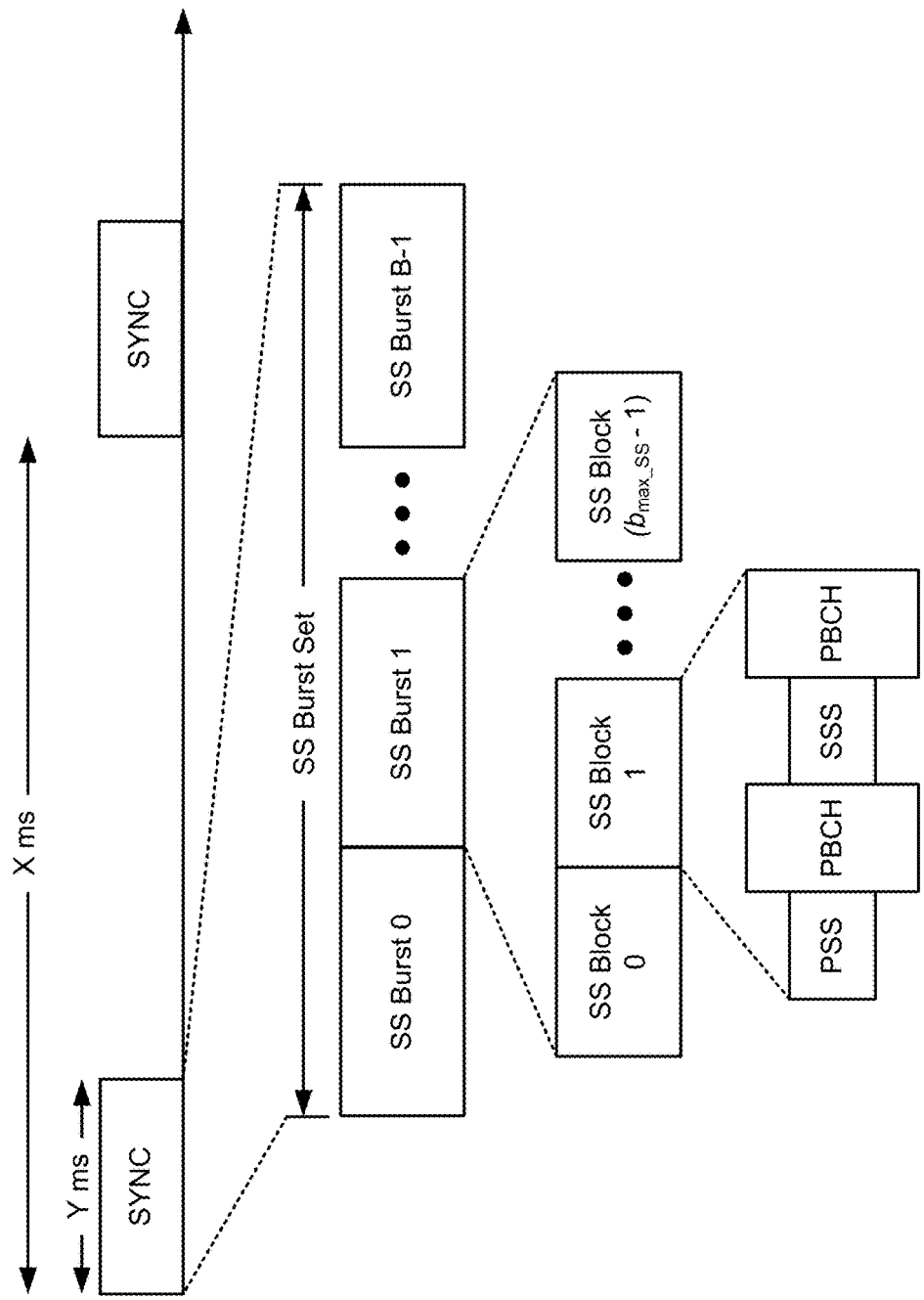
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max-SS-1}$), where $b_{max-SS-1}$ is a maximum number of SS blocks that can be carried by an SS burst. In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a TSS) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the BS according to the burst period. In other words, the SS blocks may be repeated during each SS burst. In some aspects, the SS burst set may have a burst set periodicity, whereby the SS bursts of the SS burst set are transmitted by the BS according to the fixed burst set periodicity. In other words, the SS bursts may be repeated during each SS burst set.

The BS may transmit system information, such as system information blocks (SIBs) on a physical downlink shared channel (PDSCH) in certain subframes. The BS may transmit control information/data on a physical downlink control channel (PDCCH) in B symbol periods of a subframe, where B may be configurable for each subframe. The BS may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
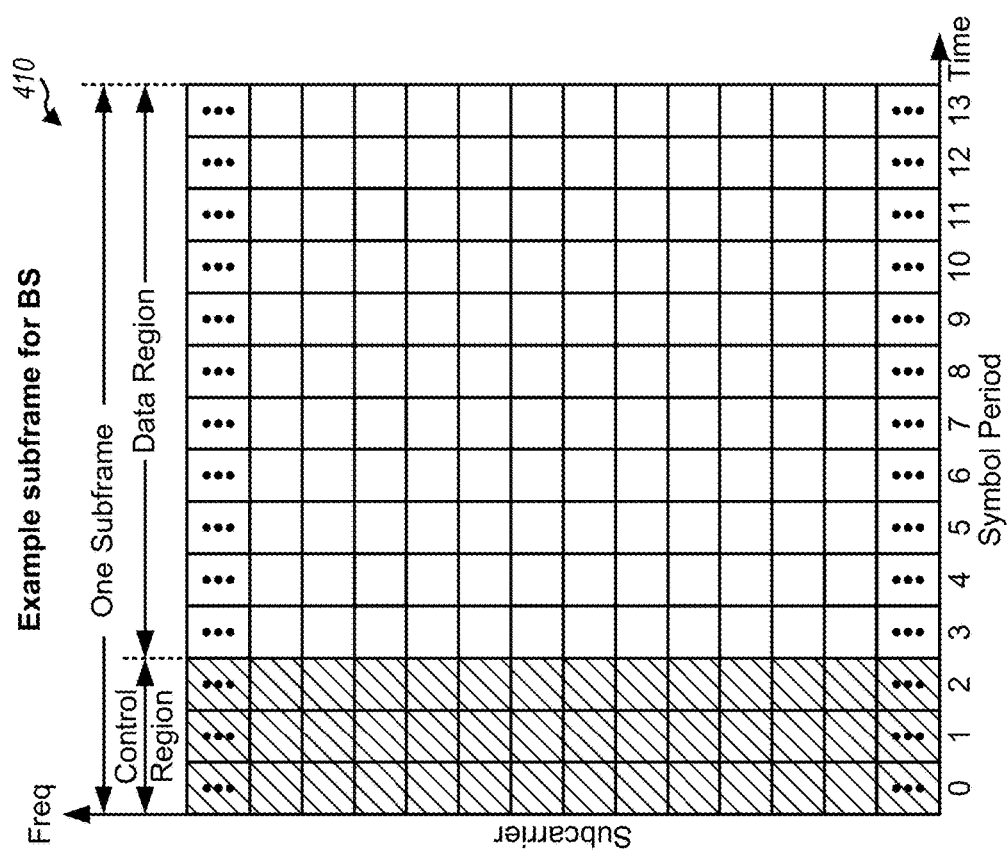
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
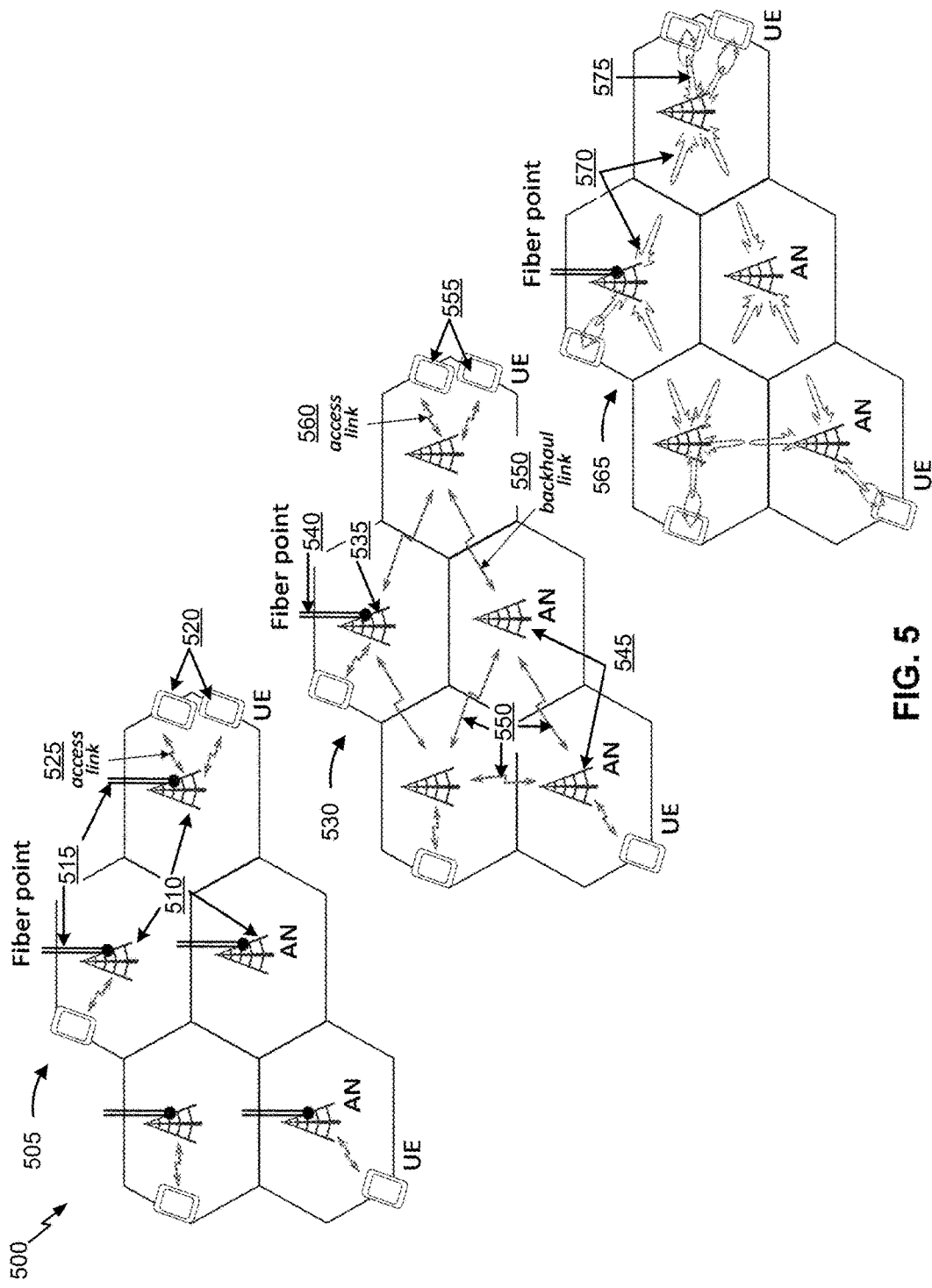
FIG. 5 is a diagram illustrating examples of radio access networks, in accordance with various aspects of the present disclosure.

FIG. 5 is a diagram illustrating examples 500 of radio access networks, in accordance with various aspects of the disclosure.

As shown by reference number 505, a traditional (e.g., 3G, 4G, LTE, etc.) radio access network may include multiple base stations 510 (e.g., access nodes (AN)), where each base station 510 communicates with a core network via a wired backhaul link 515, such as a fiber connection. A base station 510 may communicate with a UE 520 via an access link 525, which may be a wireless link. In some aspects, a base station 510 shown in FIG. 5 may correspond to a base station 110 shown in FIG. 1. Similarly, a UE 520 shown in FIG. 5 may correspond to a UE 120 shown in FIG. 1.

As shown by reference number 530, a radio access network may include a wireless backhaul network, where at least one base station is an anchor base station 535 that communicates with a core network via a wired backhaul link 540, such as a fiber connection. The wireless backhaul network may include one or more non-anchor base stations 545 that communicate directly with (or indirectly with, e.g., via one or more non-anchor base stations 545) the anchor base station 535 via one or more backhaul links 550 to form a backhaul path to the core network for carrying backhaul traffic. In some aspects, the one or more backhaul links 550 may be wireless links. Anchor base station(s) 535 and/or non-anchor base station(s) 545 may communicate with one or more UEs 555 via access links 560, which may be wireless links for carrying access traffic. In some aspects, an anchor base station 535 and/or a non-anchor base station 545 shown in FIG. 5 may correspond to a base station 110 shown in FIG. 1. Similarly, a UE 555 shown in FIG. 5 may correspond to a UE 120 shown in FIG. 1.

As shown by reference number 565, in some aspects, a radio access network that includes a wireless backhaul network may utilize millimeter wave technology and/or directional communications (e.g., beamforming, precoding, and/or the like) for communications between base stations and/or UEs (e.g., between two base stations, between two UEs, and/or between a base station and a UE). For example, the wireless backhaul links 570 between base stations may use millimeter waves to carry information and/or may be directed toward a target base station using beamforming, precoding, and/or the like. Similarly, the wireless access links 575 between a UE and a base station may use millimeter waves and/or may be directed toward a target wireless node (e.g., a UE and/or a base station). In this way, inter-link interference may be reduced.

As indicated above, FIG. 5 is provided as an example. Other examples are possible and may differ from what was described with regard to FIG. 5.

Figure 6:
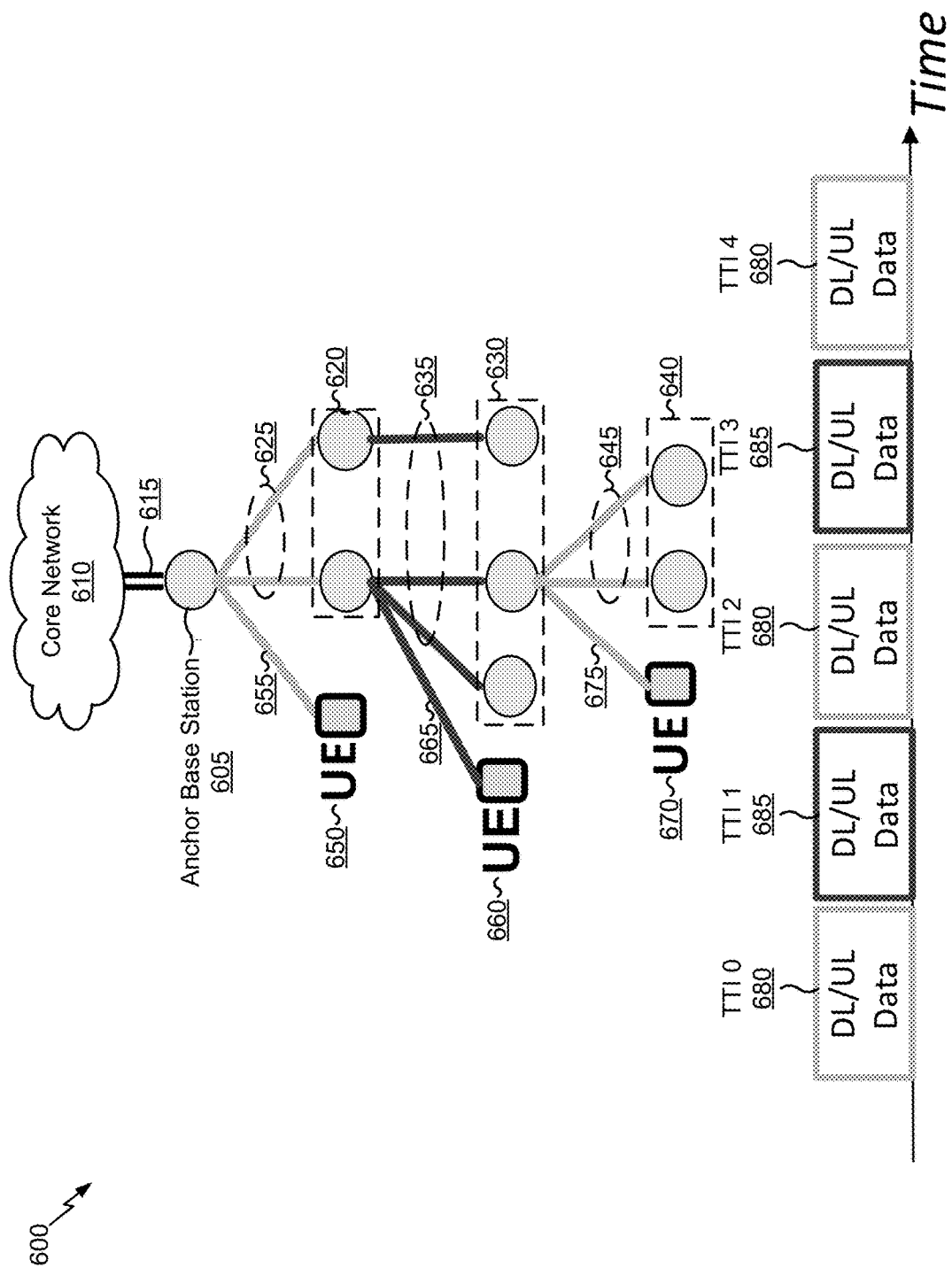
FIG. 6 is a diagram illustrating an example of resource partitioning in a wireless backhaul network, in accordance with various aspects of the present disclosure.

FIG. 6 is a diagram illustrating an example 600 of resource partitioning in a wireless backhaul network, in accordance with various aspects of the disclosure.

As shown in FIG. 6, an anchor base station 605 may be connected to a core network 610 via a wired backhaul link 615, such as a fiber connection. As further shown, non-anchor base stations 620 may communicate directly with anchor base station 605 via wireless backhaul links 625. In some aspects, one or more non-anchor base stations may communicate indirectly with anchor base station 605 via multiple wireless backhaul links (e.g., via one or more other non-anchor base stations). For example, and as shown, a first set of non-anchor base stations 630 may communicate indirectly with anchor base station 605 via a wireless backhaul link 635 and a wireless backhaul link 625. As further shown, a second set of non-anchor base stations 640 may communicate indirectly with anchor base station 605 via a wireless backhaul link 645, a wireless backhaul link 635, and a wireless backhaul link 625.

As further shown, a UE 650 may communicate with anchor base station 605 via a wireless access link 655, a UE 660 may communicate with a non-anchor base station 620 via a wireless access link 665, and a UE 670 may communicate with a non-anchor base station 630 via a wireless access link 675.

In some aspects, an index (e.g., a color index) may be assigned to a wireless link and/or a wireless node (e.g., a base station or a UE). The index may indicate one or more resources allocated to a wireless node for communication via the wireless link. For example, and as shown, a first index 680 may be associated with transmission time intervals (TTIs) 0, 2, and 4, and a second index 685 may be associated with TTIs 1 and 3. As indicated by light gray lines in FIG. 6, the first index 680 may be assigned to wireless backhaul links 625 and 645 and wireless access links 655 and 675. Thus, information may be transmitted over these links during TTIs 0, 2, and 4, and not during TTIs 1 and 3. Similarly, and as indicated by dark gray lines in FIG. 6, the second index 685 may be assigned to wireless backhaul links 635 and wireless access links 665. Thus, information may be transmitted over these links during TTIs 1 and 3, and not during TTIs 0, 2, and 4. In this way, in some aspects, wireless nodes may coordinate communication such that a wireless node is not configured to transmit and receive data at the same time.

While the resources are shown as time resources, additionally, or alternatively, an index may be associated with a frequency resource. Furthermore, the configuration of base stations and UEs in FIG. 6 is shown as an example, and other examples are possible.

As indicated above, FIG. 6 is provided as an example. Other examples are possible and may differ from what was described with regard to FIG. 6.

Figure 7A:
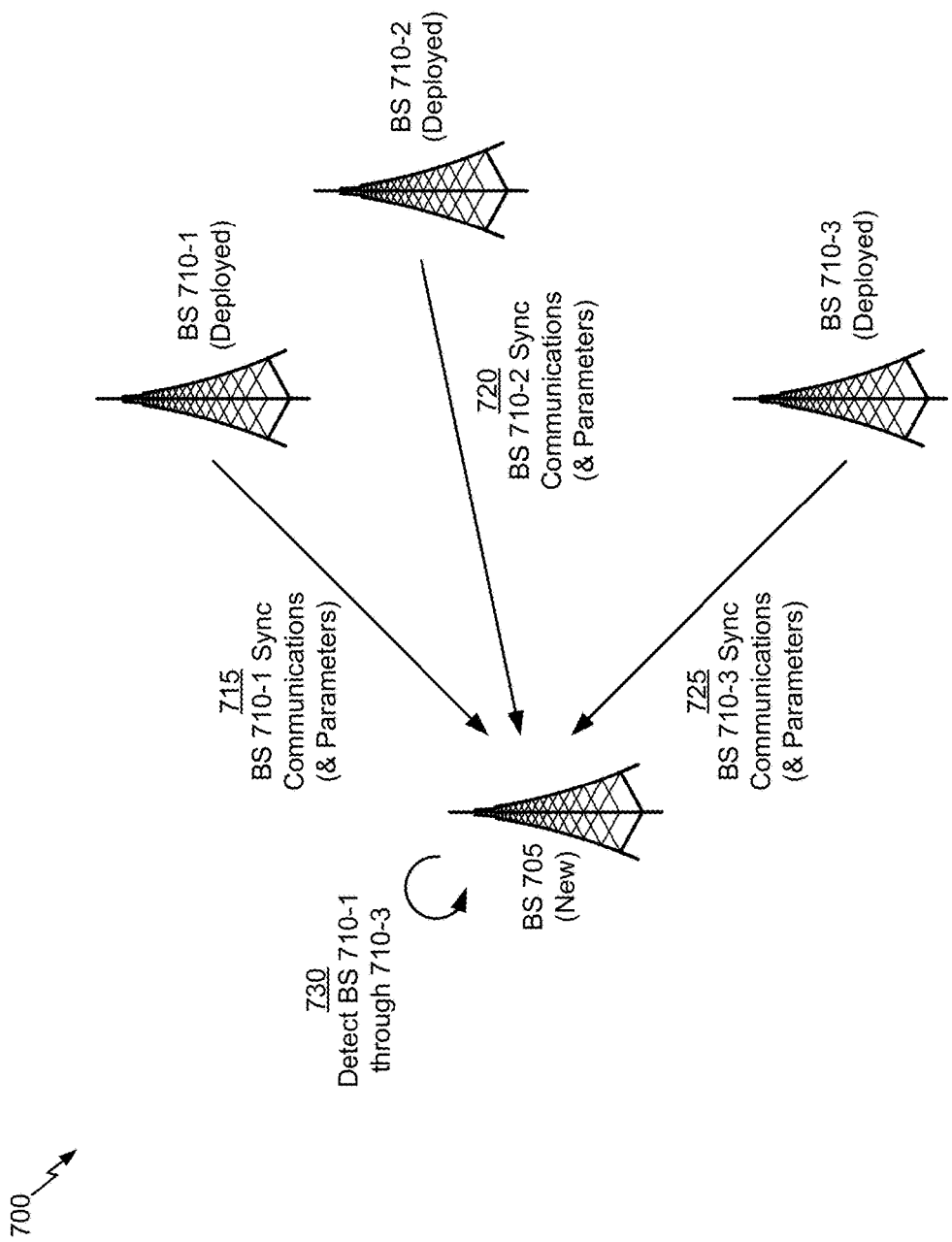
FIGS. 7A and 7B are diagrams illustrating examples associated with an access procedure for a wireless backhaul network, in accordance with various aspects of the present disclosure.
Figure 7B:
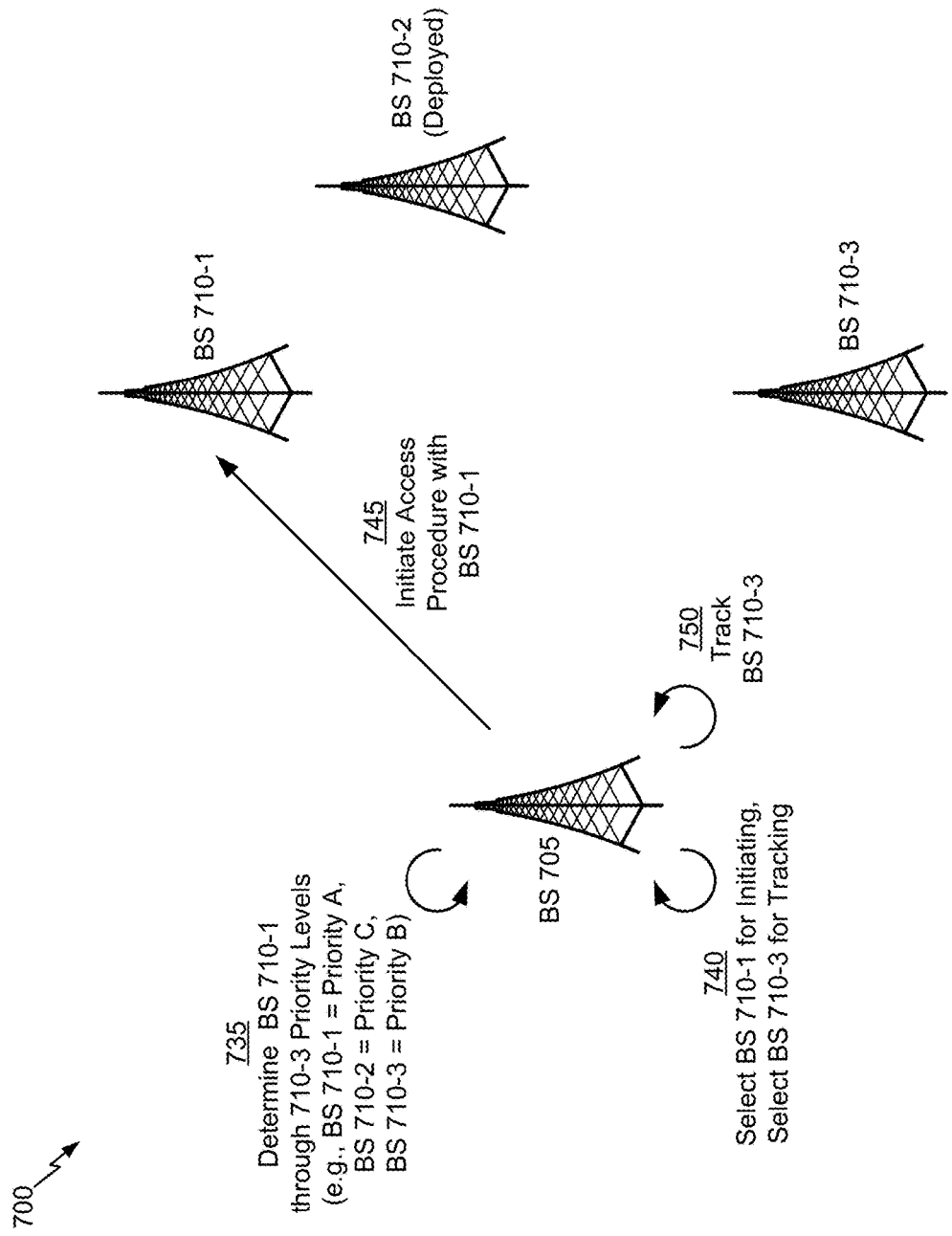

FIGS. 7A and 7B are diagrams illustrating example 700 associated with an access procedure for a wireless backhaul network, in accordance with various aspects of the present disclosure. In some aspects, base station 705 (e.g., BS 705) and/or base stations 710 (e.g., BS 710-1 through BS 710-3) in FIGS. 7A and 7B may correspond to base station 110 of FIG. 1. As shown in FIG. 7A, BSs 710-1 through 710-3 are deployed within a wireless backhaul network, while BS 705 is a new base station that is being deployed in the wireless backhaul network (e.g., for initial access to the wireless backhaul network, for access to the wireless backhaul network after previously accessing the wireless backhaul network, and/or the like).

As shown by reference number 715, BS 710-1 may transmit synchronization communications associated with BS 710-1. In some aspects, the synchronization communications may include a synchronization signal (e.g., a PSS, a SSS, a TSS), a synchronization channel (e.g., a PBCH), a reference signal (e.g., a BRS, a CSI-RS, and/or the like), and/or another type of signal based at least in part on which a base station may access a wireless backhaul network. In some aspects, the synchronization communications may be one or more SS blocks.

In some aspects, the synchronization communications may include a base station synchronization communication. A base station synchronization communication may include a synchronization communication for initiation of an access procedure, associated with connecting to a wireless backhaul network, by another base station (e.g., a base station that receives the synchronization communications, such as BS 705).

In some aspects, the synchronization communications may include a user equipment synchronization communication (e.g., a synchronization communication for initiation of an access procedure, associated with accessing a wireless access network, by a UE 120). In some aspects, when the synchronization communications include a base station synchronization communication and a user equipment synchronization communication, the base station synchronization communication and the user equipment synchronization communication may be transmitted in different frequency resources, in different time resources, at different periodicities of transmission, using different waveforms, using different beam formations (e.g., by sweeping different sets of beams, by sweeping at different beam sweep periodicities, etc.), using different transmission power, and/or the like.

In some aspects, BS 710-1 may transmit a given synchronization communication, of the synchronization communications, in accordance with a transmission configuration (e.g., a configuration for transmitting the synchronization communication). In some aspects, the transmission configuration may include, for example, information that identifies a set of frequency resources associated with the synchronization communication (e.g., a set of frequency resources to be used for transmitting the synchronization communication), a set of time resources associated with the synchronization communication (e.g., a set of time resources to be used for transmitting the synchronization communication), a periodicity associated with the synchronization communication (e.g., a period at which the synchronization communication is to be transmitted), a waveform associated with the synchronization communication (e.g., a waveform to be used for transmitting the synchronization communication), a beam formation associated with the synchronization communication (e.g., a beam formation to be used for transmitting the synchronization communication), a number of antenna ports associated with the synchronization communication, a number of reference signals associated with the synchronization communication, quasi co-location (QCL) information associated with the synchronization communication, a transmission power of the synchronization communication, or some combination thereof.

In some aspects, the transmission configuration may be periodic (e.g., such that the transmission configuration is used on a periodic basis), aperiodic (e.g., such that the transmission configuration is used on an aperiodic basis), semi-persistent (e.g., such that the transmission configuration is used on a semi-persistent basis), and/or the like.

In some aspects, the transmission configuration, associated with the synchronization communication, may be specific to a particular set of base stations (e.g., a set of base stations including BS 705). For example, BS 710-1 may be configured to use a first transmission configuration for a first set of base stations (e.g., a set of base stations positioned in a particular direction from BS 710-1, a set of base stations with a particular capability, and/or the like) and a second transmission configuration for a second set of base stations (e.g., base stations that are not positioned in the particular direction from BS 710-1, base stations without the particular capability). In this example, BS 710-1 may use the first transmission configuration when transmitting a synchronization communication to be received by the first set of base stations and may use the second transmission configuration when transmitting a synchronization communication to be received by the second set of base stations. Conversely, in some aspects, the transmission configuration may not be specific to a particular set of base stations (i.e., the transmission configuration may be used to transmit the synchronization communication in any direction, to base stations with or without the particular capability, and/or the like).

In some aspects, BS 705 may receive information that identifies the transmission configuration in order to allow BS 705 to detect the synchronization communication. For example, BS 705 may receive information that identifies a transmission configuration, associated with a synchronization communication to be transmitted by BS 710-1, based on information provided by BS 710-1 (e.g., during a time when BS 705 previously accessed the wireless backhaul network), from another base station (e.g., BS 710-2, BS 710-3, and/or the like), from a core network associated with the wireless backhaul network (e.g., a device included in the core network), and/or the like.

As further shown by reference number 715, BS 710-1 may transmit information associated with one or more parameters of BS 710-1. In some aspects, BS 710-1 may transmit the information associated with the one or more parameters of BS 710-1 based at least in part on transmitting the synchronization communications associated with BS 710-1. For example, BS 710-1 may be configured to transmit the information associated with the one or more parameters of BS 710-1 when BS 710-1 transmits the synchronization communications.

In some aspects, the information associated with the one or more parameters of BS 710-1 may include, for example, connectivity information associated with BS 710-1. In some aspects, the connectivity information may indicate that BS 710-1 is connected to a core network, was connected to the core network within a threshold amount of time, or is not connected to the core network.

As another example, the information associated with the one or more parameters of BS 710-1 may include information that identifies a hop count or backhaul link quality associated with BS 710-1 (e.g., a number of wireless links between BS 710-1 and an anchor base station associated with the wireless backhaul network, or the quality of the wireless links).

As another example, the information associated with the one or more parameters of BS 710-1 may include information that identifies an index (e.g., a color index) associated with BS 710-1.

As another example, the information associated with the one or more parameters of BS 710-1 may include a cluster identifier associated with BS 710-1 (e.g., an identifier associated with the anchor base station).

As another example, the information associated with the one or more parameters of BS 710-1 may include information associated with a capability of BS 710-1. As a particular example, the information associated with the capability may include information associated with a beam correspondence or a beam reciprocity of BS 710-1 that, for example, indicates whether BS 710-1 is capable of transmitting and receiving beams in a same direction. As another example, the information associated with the capability may include a spatial division multiplexing (SDM) capability of BS 710-1 (e.g., the capability of to support spatially multiplexing two or more communications in two or more different directions).

As another example, the information associated with the one or more parameters of BS 710-1 may include a load factor associated with BS 710-1. In some aspects, the load factor is associated with a load of a random access channel (e.g., an average load), a capacity of the random access channel (e.g., when a subset of preambles or symbols are associated with BS 710-1, then a size of the subset indicates the capacity), or a capacity of BS 710-1 (e.g., where a higher load factor may indicate a high load of random access channel, that the random access channel is nearing capacity, that BS 710-1 is nearing capacity for backhaul connections, and/or the like). In some aspects, BS 710-1 may determine the load factor based at least in part on the load of the random access channel, the capacity of the random access channel, or the capacity of BS 710-1. In some aspects, BS 710-1 may provide one or more load factors (e.g., a set of load factors, each corresponding to a different set of access channel resources). In some aspects, the load factor may be referred to as a price value in that the load factor is indicative of loading factors on particular system resources, and can be used to determine the use of those system resources (e.g., as a function of, for example, quality of service (QoS) class).

In some aspects, BS 710-1 may transmit the information associated with the one or more parameters of BS 710-1 via a PSS, a SSS, a DMRS (e.g., included in a PBCH), a master information block (MIB), a system information block (SIB), minimum system information, other system information, a resource mapping scheme, a transmission configuration associated with the synchronization communication, a radio resource control (RRC) message (e.g., when BS 705 previously accessed the wireless back network and, for example, stored the information associated with the one or more parameters in memory), and/or the like. In some aspects, the resource mapping scheme may be used to map a set of resources, used for transmitting the synchronization communications, to information that identifies a set of parameters associated with BS 710-1. Here, upon identifying resources used to transmit the synchronization communications, BS 705 may determine (e.g., based at least in part on the resource mapping scheme) the information associated with the set of parameters of BS 710-1.

Additionally, or alternatively, another base station (e.g., a base station that is different from BS 710-2, a base station that is not included in the first set of BSs 710 or the second set of BSs 710, another base station connected to the wireless backhaul network, and/or the like) and/or a core network (e.g., a device in the core network) may transmit the information associated with the one or more parameters of BS 710-1 to BS 705. In some aspects, the other base station and/or the core network may transmit the information associated with the one or more parameters of BS 710-1 via a PSS, a SSS, a DMRS, a MIB, a SIB, minimum system information, other system information, a resource mapping scheme, a transmission configuration associated with the synchronization communication, a radio resource control (RRC) message, and/or the like.

As shown by reference number 720, BS 710-2 may transmit synchronization communications and information associated with one or more parameters of BS 710-2 in a similar manner as described above with regard to BS 710-1. Further, as shown by reference number 725, BS 710-3 may transmit synchronization communications and information associated with one or more parameters of BS 710-3 in a similar manner as described above with regard to BS 710-1.

As shown by reference number 730, BS 705 may detect BS 710-1, BS 710-2, and BS 710-3 based at least in part on the synchronization communications transmitted by BS 710-1, BS 710-2, and BS 710-3, respectively. For example, BS 705 may receive the synchronization communications transmitted by BS 710-1, BS 710-2, and BS 710-3 (e.g., based on transmission configurations, associated with the synchronization communications, received by BS 705), and may detect BS 710-1, BS 710-2, and BS 710-3, accordingly. Notably, in this example, BS 705 has detected multiple base stations via which BS 705 may be capable of accessing the wireless backhaul network.

As shown in FIG. 7B, and by reference number 735, BS 705 may determine priority levels associated with the detected BSs 710. A priority level may include information that identifies a priority, associated with initiating access to a wireless backhaul network, that is assigned to a given BS 710. In some aspects, BS 705 may determine, based at least in part on a priority level of the given BS 710, whether to initiate an access procedure with the given BS 710, track the given BS 710, take no action with regard to the given BS 710, and/or the like, as described in further detail below.

In some aspects, BS 705 may determine a priority level of a given BS 710 (e.g., BS 710-1, BS 710-2, or BS 710-3) based at least in part on information associated with one or more parameters of BS 710. For example, BS 705 may determine the priority level of BS 710 based at least in part on connectivity information associated with BS 710, a hop count or the backhaul link quality associated with BS 710, an index associated with BS 710, a cluster identifier associated with BS 710, a capability of BS 710, a load factor associated with BS 710, and/or the like. Additionally, or alternatively, BS 705 may determine the priority level of the given BS 710 based at least in part on information associated with BS 705. For example, BS 705 may determine the priority level based at least in part on a capability of BS 705 (e.g., a beam correspondence capability of BS 705, a beam reciprocity capability of BS 705, a SDM capability of BS 705, and/or the like).

Additionally, or alternatively, BS 705 may determine the priority level based at least in part on information associated with a signal carrying the synchronization communications and/or the information associated with the one or more parameters of BS 710, such as a signal power associated with BS 710, a signal quality associated with BS 710, and/or the like.

In some aspects, BS 705 may determine the priority level based at least in part on a combination (e.g., an average, a weighted average, a score, and/or the like) associated with of one or more of the above described items of information associated with the given BS 710 and/or BS 705. For example, in some aspects, BS 705 may determine the priority level based at least in part on a model that receives, as input, one or more items of the information associated with the given BS 710 and provides, as output, information that identifies the priority level of the given BS 710. In some implementations, the priority level may be a numerical value (e.g., a score from 1 to 10), a letter grade, a color associated with a color scheme, and/or the like. In some implementations, the priority level may be an order of priority of the given BS 710 relative to one or more other BSs 710.

In some aspects, BS 705 may determine a priority level, associated with a given BS 710, based at least in part on a set of resources associated with one or more synchronization communications transmitted by the given BS 710. For example, BS 705 may determine the priority level, associated with the given base station, based at least in part on a set of spatial resources, associated with a synchronization communication transmitted by the given BS 710, that indicates a direction associated with the synchronization communication (i.e., that indicates an angle of arrival associated with the synchronization communication, a receive beam used to receive the synchronization communication, and/or the like).

As a particular example, and with reference to FIG. 7B, BS 705 may determine, based on detecting BS 710-1 through BS 710-3 (e.g., based on receiving one or more synchronization communications transmitted by BS 710-1 through BS 710-3), that BS 710-1 and BS 710-2 have a similar beam direction, while BS 710-3 has a spatially separate beam direction (e.g., when synchronization communications transmitted by BS 710-3 are received using a beam that is spatially separate from a beam that is used to receive those transmitted by both BS 710-1 and BS 710-2). Here, assume that (e.g., based at least in part on the techniques described above) BS 705 determines that BS 710-1 has a first (e.g., highest) priority level such that BS 705 will initiate an access procedure with BS 710-1, as described below. In this example, BS 705 may determine priority levels for BS 710-2 and/or BS 710-3 based at least in part on the spatial resources used by BS 710-2 and BS 710-3 for transmitting their respective synchronization communications. For example, in order to provide diversity and/or reliably against blocking and based at least in part on determining that BS 710-3 has a spatially separate beam direction from BS 710-1, BS 705 may determine that BS 710-3 has a second (e.g., medium) priority level (e.g., such that BS 705 will track BS 710-3, as described below). Further, based at least in part on determining that BS 710-1 and BS 710-2 have a similar beam direction, BS 705 may determine that BS 710-2 has a third (e.g., lowest) priority level (e.g., such that BS 705 will not initiate an access procedure with or track BS 710-2). Alternatively, in order to improve resource utilization and/or power utilization by BS 705 and based at least in part on determining that BS 710-1 and BS 710-2 have a similar beam direction, BS 705 may determine that BS 710-2 has the second priority level (e.g., such that BS 705 will track BS 710-2, as described below). Here, based on determining that BS 710-3 has a spatially separate beam direction from BS 710-1, BS 705 may determine that BS 710-3 has the third priority level (e.g., such that BS 705 will not initiate an access procedure with or track BS 710-3).

As another particular example, BS 705 may determine the priority level, associated with the given base station, based at least in part on a set of radio resources (e.g., frequency resources, time resources, and/or the like) used by the given BS 710 to transmit a synchronization communication. For example, BS 705 may determine, based on detecting BS 710-1 through BS 710-3 (e.g., based on receiving one or more synchronization communications transmitted by BS 710-1 through BS 710-3), that BS 710-1 and BS 710-2 use the same, similar, and/or overlapping frequency resources and/or time resources for transmitting the respective synchronization communications, while BS 710-3 uses different (e.g., non-overlapping) frequency resources and/or time resources for transmitting synchronization communications. Here, assume that (e.g., based at least in part on the techniques described above) BS 705 determines that BS 710-1 has a first (e.g., highest) priority level such that BS 705 will initiate an access procedure with BS 710-1, as described below. In this example, BS 705 may determine priority levels for BS 710-2 and/or BS 710-3 based at least in part on the frequency resources and/or time resources used by BS 710-2 and BS 710-3 for transmitting their respective synchronization communications in a manner similar to that described above.

In some aspects, as in the examples described above, BS 705 may determine a priority level, associated with a given BS 710, based at least in on a set of resources associated with one or more synchronization communications transmitted by the given BS 710, in order to reduce an amount of power consumed by BS 705, improve resource utilization associated with BS 705, increase diversity and/or reliability associated with BS 705, and/or the like.

As shown in FIG. 7B, for purposes of illustration, BS 705 determines a first priority level (e.g., A) for BS 710-1, a second priority level (e.g., B) for BS 710-3, and a third priority level (e.g., C) for BS 710-2.

As shown by reference number 740, BS 705 may select, based at least in part on the priority levels associated with the detected BSs 710, a first set of base stations with which to initiate an access procedure associated with the wireless backhaul network. For example, BS 705 may select BS 710-1 as a base station with which to initiate a connection with the wireless backhaul network (e.g., since BS 710-1 has a priority level A). In some aspects, BS 705 may select the first set of base stations based at least in part on determining that priority levels, associated with the first set of base stations, satisfy an initiation threshold. Additionally, or alternatively, BS 705 may select the first set of base stations based at least in part on determining that the priority levels, associated with the first set of base stations, are higher than one or more priority levels associated with other detected BSs 710. In some aspects, the first set of base stations may include one or more base stations.

Additionally, or alternatively, BS 705 may select the first set of base stations based at least in part on a probability distribution that is a function of load factors associated with the detected BSs 710 (e.g., where higher load factors may reduce a likelihood of selection as compared to lower load factors). In some aspects, selection of the first set of base stations in this manner may be used as part of load balancing technique associated with use of random access channel resources.

As further shown, BS 705 may select, based at least in part on the priority levels associated with the detected BSs 710, a second set of base stations for tracking. For example, BS 705 may select BS 710-3 as a base station for tracking (e.g., since BS 710-2 has a priority level B). In some aspects, BS 705 may select the second set of base stations based at least in part on determining that priority levels, associated with the second set of base stations, satisfy a tracking threshold, but do not satisfy the initiation threshold. Additionally, or alternatively, BS 705 may select the second set of base stations based at least on part determining that the priority levels, associated with the second set of base stations, are lower than priority levels associated with one or more other base stations detected by BS 705 and/or higher than priority levels associated with one or more other base stations detected by BS 705. In some aspects, the second set of base stations may include one or more base stations.

In some aspects, the first set of base stations and the second set of base stations may include a same base station. Alternatively, the first set of base stations and the second set of base stations may not include a same base station.

In some aspects, BS 705 may select the first set of base stations and/or the second set of base stations based at least in part on a capability of BS 705. The capability of BS 705 may include, for example, a beam-correspondence capability of BS 705, a power capability of BS 705, a computational capability of BS 705, a SDM capability of BS 705, and/or the like. In some aspects, a number of BSs 710 selected by BS 705 for inclusion in the first set of base stations and/or the second set of base stations may be dictated by (e.g., limited) based at least in part on the capability of BS 705.

As shown by reference number 745, BS 705 may initiate an access procedure (e.g., associated with connecting to the wireless backhaul network) with the first set of base stations. For example, after selecting the first set of base stations (e.g., BS 710-1) based at least in part on the priority levels associated with the detected BSs 710, BS 705 may initiate the access procedure with the first set of base stations.

In some aspects, initiating the access procedure may include transmitting a set of messages, associated with the access procedure, to the first set of base stations. For example, BS 705 may transmit, to BS 710-1 a message associated with the access procedure, such as a random access channel (RACH) preamble, a MSG1, and/or the like. In some aspects, based at least in part on transmitting the message, BS 705 may receive a response associated with the message (e.g., a random access response (RAR), MSG2, and/or the like). In some aspects, additional messages may be exchanged in association with the access procedure (e.g., MSG3, MSG4, and/or the like).

In some aspects, when the first set of base stations includes multiple base stations, BS 705 may transmit a message, associated with initiating the access procedure, to each of the multiple base stations included in the first set of base stations. In this way, BS 705 may initiate an access procedure, associated with connecting to the wireless backhaul network, based at least in part on priority levels associated with one or more BSs 710.

In some aspects, BS 705 may transmit, to at least one base station in the first set of base stations, an indication associated with another BS 710 of the detected BSs 710. For example, BS 705 may transmit, to BS 710-1, an indication associated with BS 710-2 and/or an indication associated with 710-3. In some aspects, the indication may allow the first set of base stations to be made aware of the other BSs 710 (e.g., such that BS 710-1 may initiate an access procedure with the other BS 710, such that BS 710-1 may track the other BS 710, and/or the like).

In some aspects, the indication associated with the other base station may include a measurement report associated with the other base station, a beam quality measurement associated with the other base station, a time offset associated with the other base station, a priority level associated with the other base station, system information associated with the other base station, a metric associated with the other base station, and/or the like.

In some aspects, BS 705 may transmit the indication to at least one base station in the first set of base stations in the set of messages associated with the access procedure (e.g., via MSG3, in the response to a random access response message (MSG2) transmitted by the at least one base station in the first set of base stations), a set of radio resource control (RRC) messages, and/or the like.

As shown by reference number 750, BS 705 may track the second set of base stations. For example, after selecting the second set of base stations (e.g., BS 710-3) based at least in part on the priority levels associated with the detected BSs 710, BS 705 may track the second set of base stations.

In some aspects, tracking the second set of base stations may include monitoring timing associated with the second set of base stations, decoding system information associated with the second set of base stations, and/or the like. In some aspects, BS 705 may track the second set of base stations such that BS 705 may initiate an access procedure with the second set of base stations at a later time (e.g., without a need to search for synchronization communications associated with the second set of base stations). In some aspects, the second set of base stations may include one or more base stations that are included in the first set of base stations. In such a case, BS 705 may track for the purposes of reestablishing a connection with the one or more base stations (e.g., in the event that a connection is lost).

In some aspects, when the second set of base stations includes multiple base stations, BS 705 may track each of the multiple base stations included in the second set of base stations. In this way, BS 705 may track one or more BSs 710 based at least in part on priority levels associated with the one or more BSs 710.

As indicated above, FIGS. 7A and 7B are provided as examples. Other examples are possible and may differ from what was described with regard to FIGS. 7A and 7B.

Figure 8:
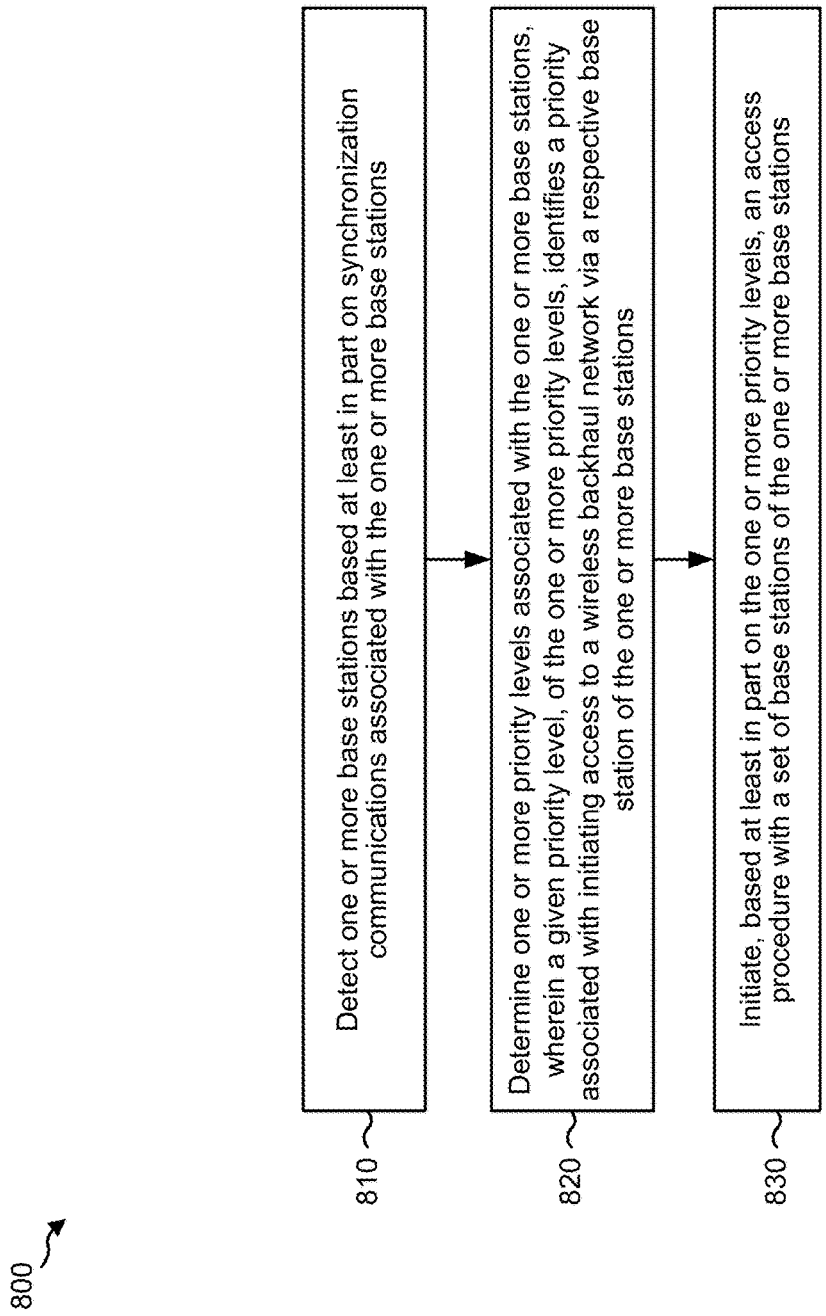
FIG. 8 is a diagram illustrating an example process performed, for example, by a base station, in accordance with various aspects of the present disclosure.

FIG. 8 is a diagram illustrating an example process 800 performed, for example, by a base station (e.g., BS 110, BS 705), in accordance with various aspects of the present disclosure.

As shown in FIG. 8, in some aspects, process 800 may include detecting one or more base stations based at least in part on synchronization communications associated with the one or more base stations (block 810). For example, a base station may detect one or more base stations based at least in part on synchronization communications associated with the one or more base stations, as described above.

As further shown in FIG. 8, in some aspects, process 800 may include determining one or more priority levels associated with the one or more base stations, wherein a given priority level, of the one or more priority levels, identifies a priority associated with initiating access to a wireless backhaul network via a respective base station of the one or more base stations (block 820). For example, the base station may determine one or more priority levels associated with the one or more base stations, wherein a given priority level, of the one or more priority levels, identifies a priority associated with initiating access to a wireless backhaul network via a respective base station of the one or more base stations, as described above.

As further shown in FIG. 8, in some aspects, process 800 may include initiating, based at least in part on the one or more priority levels, an access procedure with a set of base stations of the one or more base stations (block 830). For example, the base station may initiate, based at least in part on the one or more priority levels, an access procedure with a set of base stations of the one or more base stations, as described above.

Process 800 may include additional aspects, such as any single aspect or any combination of aspects described below and/or in connection with one or more other processes described elsewhere herein.

In some aspects, the synchronization communications include at least one of a base station synchronization communication or a user equipment synchronization communication.

In some aspects, the first set of base stations includes at least two base stations.

In some aspects, at least one other base station, of the one or more base stations, is tracked based at least in part on the one or more priority levels.

In some aspects, wherein an indication associated with another base station, of the one or more base stations, is transmitted to at least one of the first set of base stations.

In some aspects, the one or more priority levels are determined based at least in part on are determined based at least in part on one or more load factors that are associated with a load of a random access channel, a capacity of the random access channel, or a capacity of a particular base station of the one or more base stations.

In some aspects, the synchronization communications include at least one of a primary synchronization signal, a secondary synchronization signal, a physical broadcast channel, or some combination thereof.

In some aspects, the synchronization communications include a base station synchronization communication and a user equipment synchronization communication, wherein the base station synchronization communication and the user equipment synchronization communication are associated with at least one of: different frequency resources, different time resources, different periodicities of transmission, different waveforms, different beam formations, different transmission powers, or some combination thereof.

In some aspects, at least one of the synchronization communications does not include a physical broadcast channel.

In some aspects, initiating the access procedure comprises transmitting a set of messages, associated with the access procedure, to the first set of base stations.

In some aspects, the base station may receive a set of responses, associated with the set of messages, from the first set of base stations.

In some aspects, tracking the second set of base stations includes monitoring timing associated with the second set of base stations or decoding system information associated with the second set of base stations.

In some aspects, the base station may select the second set of base stations for tracking based at least in part on a capability of the base station, or select the first set of base stations for initiating the access procedure based at least in part on a capability of the base station. In some aspects, the capability of the base station is associated with at least one of: a beam-correspondence capability of the base station, a power capability of the base station, a computational capability of the base station, or some combination thereof.

In some aspects, the base station may transmit, to at least one base station in the first set of base stations, an indication associated with another base station of the one or more base stations. In some aspects, the indication associated with the other base station includes information associated with at least one of: a measurement report associated with the other base station, a beam quality measurement associated with the other base station, a time offset associated with the other base station, a priority level associated with the other base station, system information associated with the other base station, a metric associated with the other base station, or some combination thereof. In some aspects, the indication is transmitted to the at least one base station in first set of base stations in a corresponding set of messages associated with the access procedure (e.g., via MSG3, in a response to a random access response message (MSG2) transmitted by the at least one base station in the first set of base stations), or a corresponding set of radio resource control messages. In some aspects, the set of messages is a third set of messages associated with the access procedure, wherein the third set of messages is transmitted in response to a second set of messages, associated with the access procedure, transmitted by the first set of base stations.

In some aspects, a particular priority level, of the one or more priority levels, corresponding to a particular base station, of the one or more base stations, is determined based at least in part on information associated with the particular base station including at least one of: a signal power associated with the particular base station, a signal quality associated with the particular base station, connectivity information associated with the particular base station, a hop count or a backhaul link quality associated with the particular base station, an index associated with the particular base station, a cluster identifier associated with the particular base station, a capability of the particular base station, a load factor associated with the particular base station, or some combination thereof. In some aspects, the connectivity information indicates that the particular base station: is connected to a core network, was connected to the core network within a threshold amount of time, or is not connected to the core network.

In some aspects, the base station may receive the information associated with the particular base station via at least one of: a primary synchronization signal, a secondary synchronization signal, a demodulation reference signal in a physical broadcast channel, a master information block, a system information block, minimum system information, other system information, resource mapping associated with one or more synchronization signals and a physical broadcast channel, or some combination thereof.

In some aspects, the load factor is associated with a load of a random access channel, a capacity of the random access channel, or a capacity of the particular base station. In some aspects, the information associated with the particular base station includes the load factor associated with the particular base station, and the base station may select the first set of base stations for initiating the access procedure based at least in part on a probability distribution associated with the load factor of the particular base station and a set of load factors associated with a set of base stations of the one or more base stations.

In some aspects, the capability is associated with a beam correspondence capability of the base station or a beam reciprocity capability of the base station.

In some aspects, the first set of base stations and the second set of base stations include a same base station.

In some aspects, the first set of base stations and the second set of base stations do not include a same base station.

In some aspects, the synchronization communications include one or more synchronization signal blocks.

In some aspects, the synchronization communications include a reference signal associated with at least one base station of the one or more base stations. In some aspects, the reference signal includes a beam reference signal, a channel state information reference signal, or some combination thereof.

In some aspects, a transmission configuration, associated with a synchronization communication of the synchronization communications, is specific to a particular set of base stations, wherein the particular set of base stations includes the base station.

In some aspects, a transmission configuration, associated with a synchronization communication of the synchronization communications, includes information that identifies at least one of: a set of frequency resources associated with the synchronization communication, a set of time resources associated with the synchronization communication, a periodicity of transmissions associated with the synchronization communication, a waveform associated with the synchronization communication, a beam formation associated with the synchronization communication, a number of antenna ports associated with the synchronization communication, a number of reference signals associated with the synchronization communication, quasi co-location information associated with the synchronization communication, a transmission power associated with the synchronization communicating, or some combination thereof.

In some aspects, a transmission configuration, associated with a synchronization communication of the synchronization communications, is periodic, aperiodic, or semi-persistent.

In some aspects, information that identifies a transmission configuration, associated with a synchronization communication of the synchronization communications that is transmitted by a particular base station of the one or more base stations, is received from at least one of: the particular base station, another base station of the one or more base stations, a core network, or some combination thereof.

In some aspects, information associated with determining a particular priority level, of the one or more priority levels, corresponding to a particular base station, of the one or more base stations, is received from at least one of: the particular base station, another base station of the one or more base stations, a core network, or some combination thereof.

In some aspects, information associated with determining a particular priority level, of the one or more priority levels, corresponding to a particular base station, of the one or more base stations, is received via a radio resource control message.

In some aspects, a particular base station, of the one or more base stations, is selected for initiating the access procedure or is selected for tracking based at least in part on at least one of: a capability of the base station, a capability of the particular base station, or some combination thereof. In some aspects, the capability of the base station or the capability of the particular base station is a spatial division multiplexing capability.

In some aspects, a particular priority level, of the one or more priority levels, corresponding to a particular base station, of the one or more base stations, is determined based at least in part on a set of resources, wherein the set of resources is for a synchronization communication of the synchronization communications associated with the particular base station. In some aspects, the particular priority level is determined in part to at least one of: reduce an amount of power consumed by the base station, improve resource utilization associated with the base station, increase diversity and reliability associated with the base station, or some combination thereof. In some aspects, the set of resources includes a set of spatial resources, wherein the set of spatial resources indicates a direction associated with the synchronization communication associated with the particular base station. In some aspects, the set of resources includes a first set of radio resources.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
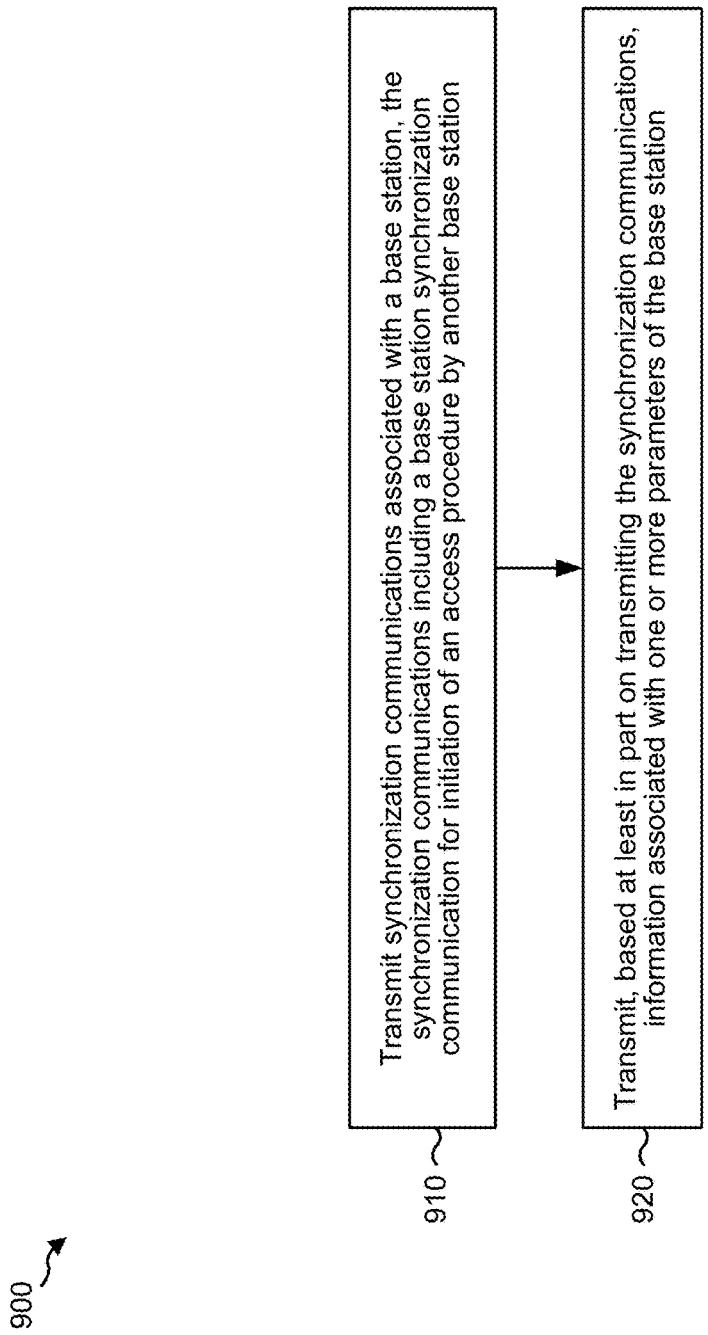
FIG. 9 is a diagram illustrating an example process performed, for example, by a base station, in accordance with various aspects of the present disclosure.

FIG. 9 is a diagram illustrating an example process 900 performed, for example, by a base station (e.g., BS 110), in accordance with various aspects of the present disclosure.

As shown in FIG. 9, in some aspects, process 900 may include transmitting synchronization communications associated with a base station, the synchronization communications including a base station synchronization communication for initiation of an access procedure by another base station (block 910). For example, a base station may transmit synchronization communications associated with the base station, the synchronization communications including a base station synchronization communication for initiation of an access procedure by another base station, as described above.

As further shown in FIG. 9, in some aspects, process 900 may include transmitting, based at least in part on transmitting the synchronization communications, information associated with one or more parameters of the base station (block 920). For example, the base station may transmit, based at least in part on transmitting the synchronization communications, information associated with one or more parameters of the base station, as described above.

Process 900 may include additional aspects, such as any single aspect or any combination of aspects described below and/or in connection with one or more other processes described elsewhere herein.

In some aspects, the synchronization communications include at least one of a primary synchronization signal, a secondary synchronization signal, a physical broadcast channel, or some combination thereof.

In some aspects, the synchronization communications further include a user equipment synchronization communication.

In some aspects, the base station synchronization communication and the user equipment synchronization communication are associated with at least one of: different frequency resources, different time resources, different periodicities of transmission, different waveforms, different beam formations, different transmission powers, or some combination thereof.

In some aspects, the base station synchronization communication does not include a physical broadcast channel.

In some aspects, the information associated with the one or more parameters of the base station includes at least one of: connectivity information associated with the base station, a hop count or a backhaul link quality associated with the base station, an index associated with the base station, a cluster identifier associated with the base station, information associated with a capability of the base station, a load factor associated with the base station, or some combination thereof. In some aspects, the load factor is associated with a load of a random access channel, a capacity of the random access channel, or a capacity of the base station. In some aspects, the load factor of the base station may be determined based at least in part on a load of a random access channel or a capacity of the random access channel.

In some aspects, the connectivity information indicates that the base station: is connected to a core network, was connected to the core network within a threshold amount of time, or is not connected to the core network.

In some aspects, the information associated with the one or more parameters of the base station is transmitted via at least one of: a primary synchronization signal, a secondary synchronization signal, a demodulation reference signal in a physical broadcast channel, a master information block, a system information block, minimum system information, other system information, resource mapping associated with one or more synchronization signals and a physical broadcast channel, or some combination thereof.

In some aspects, the synchronization communications include a reference signal associated with the base station. In some aspects, the reference signal includes a beam reference signal, a channel state information reference signal, or some combination thereof.

In some aspects, a transmission configuration, associated with a synchronization communication of the synchronization communications, is specific to a particular set of base stations.

In some aspects, a transmission configuration, associated with a synchronization communication of the synchronization communications, includes information that identifies at least one of: a set of frequency resources associated with the synchronization communication, a set of time resources associated with the synchronization communication, a periodicity of transmissions of the synchronization communication, a waveform associated with the synchronization communication, a beam formation associated with the synchronization communication, a number of antenna ports associated with the synchronization communication, a number of reference signals associated with the synchronization communication, quasi co-location information associated with the synchronization communication, a transmission power associated with the synchronization communications, or some combination thereof.

In some aspects, a transmission configuration, associated with a synchronization communication of the synchronization communications, is periodic, aperiodic, or semi-persistent.

In some aspects, information that identifies a transmission configuration, associated with a synchronization communication of the synchronization communications, is transmitted by at least one of: the base station, another base station, a core network, or some combination thereof.

In some aspects, information associated with determining a priority level, corresponding to the base station, is transmitted by at least one of: the base station, another base station, a core network, or some combination thereof.

In some aspects, information associated with determining a priority level, corresponding to the base station, is transmitted via a radio resource control message.

In some aspects, the base station is selected for initiation of the access procedure based at least in part on at least one of: a capability of the base station, a capability of the other base station, or some combination thereof. In some aspects, the capability of the base station or the capability of the other base station is a spatial division multiplexing capability.

In some aspects, a priority level, corresponding to the base station, is determined based at least in part on a set of resources, wherein the set of resources is used for a synchronization communication of the synchronization communications associated with the base station. In some aspects, the set of resources includes a set of spatial resources, wherein the set of spatial resources indicates a direction associated with the synchronization communication associated with the particular base station. In some aspects, the set of resources includes a set of radio resources.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

For example, while the techniques and apparatuses described above are described in the context of a base station being integrated into the wireless backhaul network for a first time (e.g., with no prior knowledge associated with other base stations that are already deployed in the wireless backhaul network), these techniques and apparatuses may be applied to a base station that has been previously deployed in the wireless backhaul network.

As a particular example, these techniques and apparatuses may be applied, for example, during a neighbor cell search process in order to detect, access, and/or track other deployed base stations. Here, a first base station (e.g., the previously deployed base station) may receive information from a second base station (e.g., a base station that is or was in contact with the first base station) regarding a third base station. The information associated with the third base station may assist the first base station in a determination of whether to track and/or access the third base station when the first base detections the third base station. The information associated with the third base station may be transmitted by the second base station (e.g., in any of the manners described above), and may be received by the first base station during an access process associated with the second base station (e.g., via a synchronization communication, as described above), or via a signal associated with a connection between the first base station and the second base station (e.g., via an RRC message, as described above).

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication, comprising:
   detecting, by a base station, one or more base stations based at least in part on synchronization communications associated with the one or more base stations;
   determining, by the base station, one or more priority levels associated with the one or more base stations,
      wherein a given priority level, of the one or more priority levels, identifies a priority associated with initiating access to a wireless backhaul network via a respective base station of the one or more base stations; and
   initiating, by the base station and based at least in part on the one or more priority levels, an access procedure with a set of base stations of the one or more base stations.

2. The method of claim 1, wherein the synchronization communications include at least one of a base station synchronization communication or a user equipment synchronization communication.

3. The method of claim 1, wherein the set of base stations includes at least two base stations.

4. The method of claim 1, wherein at least one other base station, of the one or more base stations, is tracked based at least in part on the one or more priority levels.

5. The method of claim 1, wherein an indication associated with another base station, of the one or more base stations, is transmitted to at least one of the set of base stations.

6. The method of claim 1, wherein the one or more priority levels are determined based at least in part on one or more load factors that are associated with a load of a random access channel, a capacity of the random access channel, or a capacity of a particular base station of the one or more base stations.

7. The method of claim 1, wherein the synchronization communications include a reference signal associated with at least one base station of the one or more base stations.

8. The method of claim 7, wherein the reference signal includes a beam reference signal, a channel state information reference signal, or some combination thereof.

9. The method of claim 1, wherein the synchronization communications include a base station synchronization communication and a user equipment synchronization communication,
   wherein the base station synchronization communication and the user equipment synchronization communication are associated with at least one of:
      different frequency resources,
      different time resources,
      different periodicities of transmission,
      different waveforms,
      different beam formations,
      different transmission powers, or
      some combination thereof.

10. The method of claim 1, wherein a transmission configuration, associated with a synchronization communication of the synchronization communications, is specific to a particular set of base stations,
   wherein the particular set of base stations includes the base station.

11. The method of claim 1, wherein a transmission configuration, associated with a synchronization communication of the synchronization communications, includes information that identifies at least one of:
   a set of frequency resources associated with the synchronization communication,
   a set of time resources associated with the synchronization communication,
   a periodicity of transmissions associated with the synchronization communication, a waveform associated with the synchronization communication,
a beam formation associated with the synchronization communication,
a number of antenna ports associated with the synchronization communication,
a number of reference signals associated with the synchronization communication,
quasi co-location information associated with the synchronization communication,
a transmission power, or
some combination thereof.

12. The method of claim 1, wherein a transmission configuration, associated with a synchronization communication of the synchronization communications, is periodic, aperiodic, or semi-persistent.

13. The method of claim 1, wherein information that identifies a transmission configuration, associated with a synchronization communication of the synchronization communications that is transmitted by a particular base station of the one or more base stations, is received from at least one of:
the particular base station,
another base station of the one or more base stations,
a core network, or
some combination thereof.

14. The method of claim 1, wherein information associated with determining a particular priority level, of the one or more priority levels, corresponding to a particular base station, of the one or more base stations, is received from at least one of:
the particular base station,
another base station of the one or more base stations,
a core network, or
some combination thereof.

15. The method of claim 1, wherein information associated with determining a particular priority level, of the one or more priority levels, corresponding to a particular base station, of the one or more base stations, is received via a radio resource control message.

16. The method of claim 1, wherein a particular base station, of the one or more base stations, is selected for initiating the access procedure or is selected for tracking based at least in part on at least one of:
a capability of the base station,
a capability of the particular base station, or
some combination thereof.

17. The method of claim 16, wherein the capability of the base station or the capability of the particular base station is a spatial division multiplexing capability.

18. The method of claim 1, wherein a particular priority level, of the one or more priority levels, corresponding to a particular base station, of the one or more base stations, is determined based at least in part on a set of resources,
wherein the set of resources is for a synchronization communication of the synchronization communications associated with the particular base station.

19. The method of claim 18, wherein the particular priority level is determined in part to at least one of:
reduce an amount of power consumed by the base station,
improve resource utilization associated with the base station,
increase diversity and reliability associated with the base station, or
some combination thereof.

20. The method of claim 18, wherein the set of resources includes a set of spatial resources, wherein the set of spatial resources indicates a direction associated with the synchronization communication associated with the particular base station.

21. A base station for wireless communication, comprising:
a memory; and
one or more processors operatively coupled to the memory, the memory and the one or more processors configured to:
detect one or more base stations based at least in part on synchronization communications associated with the one or more base stations;
determine one or more priority levels associated with the one or more base stations,
wherein a given priority level, of the one or more priority levels, identifies a priority associated with initiating access to a wireless backhaul network via a respective base station of the one or more base stations; and
initiate, based at least in part on the one or more priority levels, an access procedure with a set of base stations of the one or more base stations.

22. The base station of claim 21, wherein the synchronization communications include at least one of a base station synchronization communication or a user equipment synchronization communication.

23. The base station of claim 21, wherein at least one other base station, of the one or more base stations, is tracked based at least in part on the one or more priority levels.

24. The base station of claim 21, wherein an indication associated with another base station, of the one or more base stations, is transmitted to at least one of the set of base stations.

25. The base station of claim 21, wherein the one or more priority levels are determined based at least in part on one or more load factors that are associated with a load of a random access channel, a capacity of the random access channel, or a capacity of a particular base station of the one or more base stations.

26. A non-transitory computer-readable medium storing instructions for wireless communication, the instructions comprising:
one or more instructions that, when executed by one or more processors of a base station, cause the one or more processors to:
detect one or more base stations based at least in part on synchronization communications associated with the one or more base stations;
determine one or more priority levels associated with the one or more base stations,
wherein a given priority level, of the one or more priority levels, identifies a priority associated with initiating access to a wireless backhaul network via a respective base station of the one or more base stations; and
initiate, based at least in part on the one or more priority levels, an access procedure with a set of base stations of the one or more base stations.

27. The non-transitory computer-readable medium of claim 26, wherein at least one other base station, of the one or more base stations, is tracked based at least in part on the one or more priority levels.

28. A method of wireless communication, comprising:
determining, by a base station, a load factor associated with the base station;
transmitting, by the base station and to a different base station, information associated with the load factor, wherein the load factor is transmitted in association with determining a priority level associated with the base station, wherein the priority level identifies a priority associated with initiating access to a wireless backhaul network via the base station, and wherein an access procedure is initiated by the different base station based at least in part on the priority level.

29. The method of claim 28, wherein the load factor is determined based at least in part on at least one of:

a load of a random access channel associated with the base station, a capacity of the random access channel associated with the base station, or a capacity of the base station.

30. The method of claim 28, wherein the information associated with the load factor is transmitted via at least one of:

a master information block (MIB), a system information block (SIB), minimum system information, a resource mapping scheme, a transmission configuration associated with a synchronization communication, or a radio resource control (RRC) message.

* * * * *